United States Patent
Roemerman

(10) Patent No.: US 6,823,100 B1
(45) Date of Patent: Nov. 23, 2004

(54) OPTICAL BACKPLANE FOR USE WITH A COMMUNICATIONS EQUIPMENT CHASSIS AND METHOD OF OPERATION THEREFOR

(75) Inventor: Steven D. Roemerman, Highland Village, TX (US)

(73) Assignee: Incucomm, Inc., Dallas, TX (US)

( * ) Notice: Subject to any disclaimer, the term of this patent is extended or adjusted under 35 U.S.C. 154(b) by 99 days.

(21) Appl. No.: 10/227,986

(22) Filed: Aug. 26, 2002

Related U.S. Application Data
(60) Provisional application No. 60/135,143, filed on Aug. 27, 2001.

(51) Int. Cl.[7] ................................................. G02B 6/35
(52) U.S. Cl. ........................... 385/18; 385/134; 385/16
(58) Field of Search ............................. 385/16–20, 134, 385/33–36

(56) References Cited

U.S. PATENT DOCUMENTS

| | | | |
|---|---|---|---|
| 4,872,739 A | * | 10/1989 | Kahn et al. .................... 385/24 |
| 4,910,396 A | | 3/1990 | Grove |
| 5,182,780 A | * | 1/1993 | Robertson ..................... 385/14 |
| 5,282,222 A | | 1/1994 | Fattouche et al. |
| 5,920,664 A | * | 7/1999 | Hirabayashi et al. ......... 385/16 |
| 6,212,314 B1 | | 4/2001 | Ford |
| 6,215,585 B1 | * | 4/2001 | Yoshimura et al. ......... 359/344 |
| 6,234,688 B1 | | 5/2001 | Boger et al. |
| 6,236,778 B1 | * | 5/2001 | Laughlin ...................... 385/24 |
| 6,253,011 B1 | | 6/2001 | Haake |
| 6,414,767 B1 | * | 7/2002 | Blair et al. ................... 398/59 |
| 6,445,844 B1 | * | 9/2002 | Neukermans et al. ......... 385/18 |
| 6,538,818 B2 | * | 3/2003 | Holmes ...................... 359/618 |

OTHER PUBLICATIONS

U.S. patent application Ser. No. 10/090,249, Volpi et al., filed Mar. 4, 2002.
U.S. patent application Ser. No. 10/090,270, Volpi et al., filed Mar. 4, 2002.

* cited by examiner

*Primary Examiner*—Nimeshkumar D. Patel
*Assistant Examiner*—Dalei Dong
(74) *Attorney, Agent, or Firm*—Slater & Matsil, L.L.P.

(57) ABSTRACT

The present invention provides in part an optical backplane for use with a communications equipment chassis, an optical communications system including the optical backplane, and a method of use therefor. The optical backplane, in one embodiment of the invention, may include a reflector system coupled to a wall of a communications equipment chassis and having a signal incidence surface and a signal reflective surface. The signal incidence surface may be positioned on the wall and optically alignable with a transmitter positioned within the communications equipment chassis. Further, the signal reflective surface may be positioned on the wall and optically alignable with a receiver positioned within the communications equipment chassis.

25 Claims, 7 Drawing Sheets

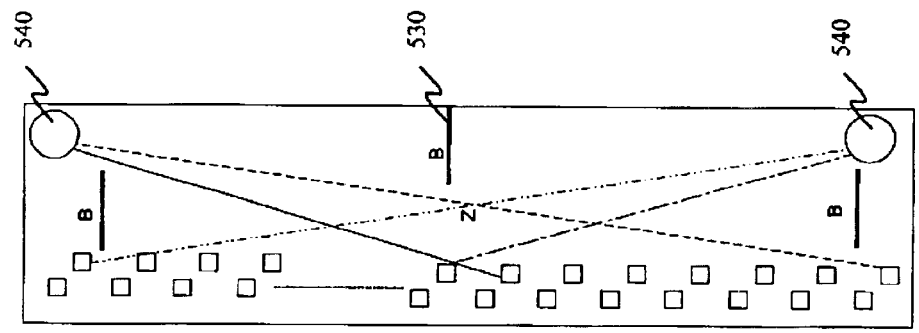
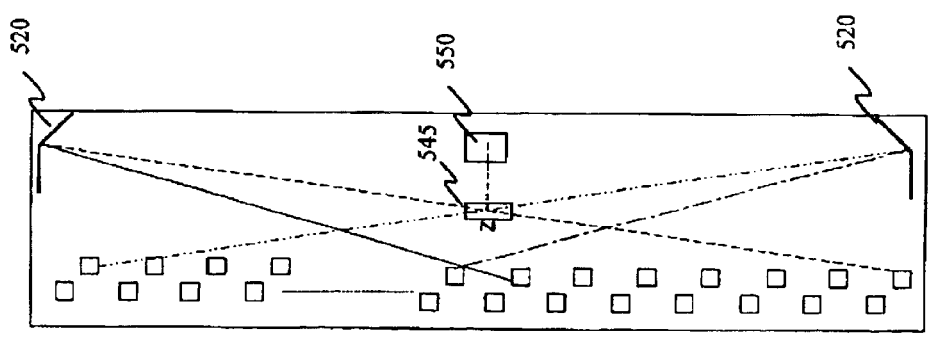
FIGURE 5B
FIGURE 5A

OPTICAL BACKPLANE FOR USE WITH A COMMUNICATIONS EQUIPMENT CHASSIS AND METHOD OF OPERATION THEREFOR

CROSS-REFERENCE TO PROVISIONAL APPLICATION

This application claims the benefit of U.S. Provisional Application No. 60/315,143 entitled "SYSTEM AND METHOD FOR OPTICAL NETWORKING INTERCONNECTIONS," to Steven D. Roemerman, filed on Aug. 27, 2001, which is commonly assigned with the present invention and incorporated herein by reference as if reproduced herein in its entirety.

TECHNICAL FIELD OF THE INVENTION

The present invention is directed, in general, to optical networking and, more specifically, to an optical backplane for use with a communications equipment chassis, an optical communications system including the same, and a method of operation therefor.

BACKGROUND OF THE INVENTION

In communications, networking and information technology industries, the reduction of network performance problems, outages, and service delays (collectively "downtime") is of major concern. Also of concern is the reduction of downtime due to system reconfiguration, failures, and maintenance.

One method of replacing and/or adding individual devices in a network, without taking action to remove electrical power from a system, is known as "hot swap and add." In this method and system, in order to remove an individual device from the collective system, to replace an individual device with a new one, or add a new individual device to the collective system, only the particular individual device which is to be replaced or is to be inserted is powered down, while the remaining slots, elements, components, devices, and subsystems of the network remain operational. Using such a method, network operations and service to clients is minimally disrupted. In some embodiments of this hot swap method, the physical removal of an element from the collective system automatically removes power, and the maintenance and repair personnel take no separate action to remove power.

In some configurations, elements of the collective system support hot swapping by connecting a data interface through "blind connectors." These blind connectors mate to a "backplane" board or other similar device in a rack, a computer, switch, router, server, or other system. This type of connection is well known in electronics, and is desirable because the physical act of placing the element into its desired location is also the act that establishes the power and data connections. No separate actions are required to attach connectors, to mate cables, or to connect power.

In some configurations, elements of the collective system are mounted in an equipment rack. As the size of network elements and other network system elements have been reduced, the number of interconnections on the front and back of such racks have become problematic. When a very large number of wires must be connected in a small space, several problems may be experienced. Among these problems, are that the tangle of the connectors leads to errors in connection and disconnection, and, that connections, which must not be turned more tightly than a prescribed radius, are often degraded.

While many of the above-described techniques and devices have been discussed in the context of electrical communications systems, there is currently a need for such techniques and devices in optical communications systems.

A number of embodiments of optical transmitters and receivers capable of data transmission and reception at rates well above one hundred million bits per second, and even above one billion bits per second, are currently used. The cost of some of these devices has become quite low, in part due to their popular use in consumer entertainment devices, and in computer data storage devices. In addition, even higher performance transmitters and receivers are well known and understood in the fields of optical networking. These telecommunications class devices are used in a variety of optical communications systems and applications.

A growing field of interest is the use of optical interconnections to provide data bandwidths higher than is practical with connections made by conductive wires and electronic signals. Examples of such interconnections include the GigE version of Ethernet communications, which may operate at a fundamental bit rate of one billion bits per second. Higher speed networks, which are expected to be implemented only by means of optical interconnects, are also becoming prevalent.

Existing optical interconnections do not lend themselves well to the electronic hot swap methodologies, because they require alignment of the optical fiber at each connection to devices such as, but not limited to, optical transmitters, optical receivers, optical splitters, fiberoptic splices, DWDM management devices, and at any other optical fiber interconnection point, whether for a single mode or multi-mode fiber. The requirement to insure proper connection and termination of optical fibers requires special tools, operator training, and repair time, among other limitations which are well known in the art of fiber connections.

A number of approaches have been proposed to reduce the costs of optical fiber interconnections, to improve the quality of the resulting interconnections, or to achieve both ends. For example, see U.S. Pat. No. 6,253,011 to John M. Haake and entitled "Micro-aligner for precisely aligning an optical fiber and an associated fabrication method." In addition there are a number of available connectors and patch cords, which incorporate some of the characteristics of electrical connectors. However, optical connections, even when made with these aides, are still very vulnerable to contamination by debris in the optical interface, may involve considerable signal loss, and may require use of optical coupling gel to assure consistent performance.

A number of approaches have been proposed to provide for the connection of a plurality of optical signals. Most of these involve opto-electronic devices, micro-electromechanical system (MEMS) shutters or matrices of active mirrors, the use of optical waveguides, or some combination of these elements (for example, see U.S. Pat. Nos. 4,910, 396, 6,212,314, and 6,234,688). None of these approaches, however, eliminate the need for fiber optic connections.

Thus, even in the context of devices designed for hot swapping, much of the prior art systems, methods, and processes are tedious, are not conducive to preventing mistakes, and can lead to additional network performance problems, outages, and service delays. In the context of systems that need an arbitrary number of connections, the dependence on splitters or switches is not conducive to several desirable optical network topologies.

Accordingly, what is needed in the art is an optical communications system that may take advantage of many of the above-referenced benefits of the electronic communications systems, however, one that does not have many of the drawbacks associated with the optical communications systems currently used today.

SUMMARY OF THE INVENTION

To address the above-discussed deficiencies of the prior art, the present invention provides in part an optical backplane for use with a communications equipment chassis. The optical backplane, in one embodiment of the invention, may include a reflector system coupled to a wall of a communications equipment chassis and having a signal incidence surface and a signal reflective surface. The signal incidence surface may be positioned on the wall and optically alignable with a transmitter positioned within the communications equipment chassis. Further, the signal reflective surface may be positioned on the wall and optically alignable with a receiver positioned within the communications equipment chassis.

The present invention is further directed to an optical communications system including the optical backplane, and a method of use therefor. In addition to the elements of the optical backplane disclosed above, the optical communications system may include a communications equipment chassis having a transmitter and a receiver positioned therein, wherein the transmitter and receiver are aligned with the signal incidence surface and signal reflective surface, respectively.

The foregoing has outlined preferred and alternative features of the present invention so that those skilled in the art may better understand the detailed description of the invention that fallows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIGS. 5A and 5B illustrate two different configurations for an optical backplane in accordance with the principles of the present invention;

DETAILED DESCRIPTION

The present invention addresses certain drawbacks associated with prior art optical communications systems, and more specifically addresses certain needs related to rapid, reliable optical communication between a plurality of devices within an optical communications system. In one embodiment of the present invention, this is accomplished by providing a system in which optical transmitters and receivers located within a communications equipment chassis may be provided an optical light path, and thus a data connection, by means of a series of one or more reflective elements.

The present invention, in contrast to that of the prior art, does not require a substantial number of optical fiber interconnections connecting the optical transmitters and receivers located within the communications equipment chassis. In an exemplary embodiment, the present invention operates without a single physical connection (e.g., optical waveguide) between the plurality of transmitters and receivers located within the communications equipment chassis.

The present invention is further designed to provide an optical communications system that includes an optical signal mixer by which optical signals from different sources are received and mixed, and from which those mixed optical signals are transmitted to a plurality of receivers. The optical communications system may further include a device that reassembles each of the mixed signals into their original configuration such that they may each be transmitted to their intended destination.

Something known as the 802.3 protocol, provides for deconfliction and re-transmission where two transmitters both send signals simultaneously, thus mixing to create a data collision. In dense wavelength division multiplexing (DWDM) systems, signals of different wavelengths share a common optical path, and must be managed with filters, splitters, and other DWDM management devices. Another example is the case in which orthogonal codes are used to separate signals which have been transmitted through a shared medium. In one embodiment, the re-assembly device may include a photon detector optically coupled to an access controller, such as a MAC layer. As such, the present invention, may in part, provide an optical Ethernet.

Figure 1:
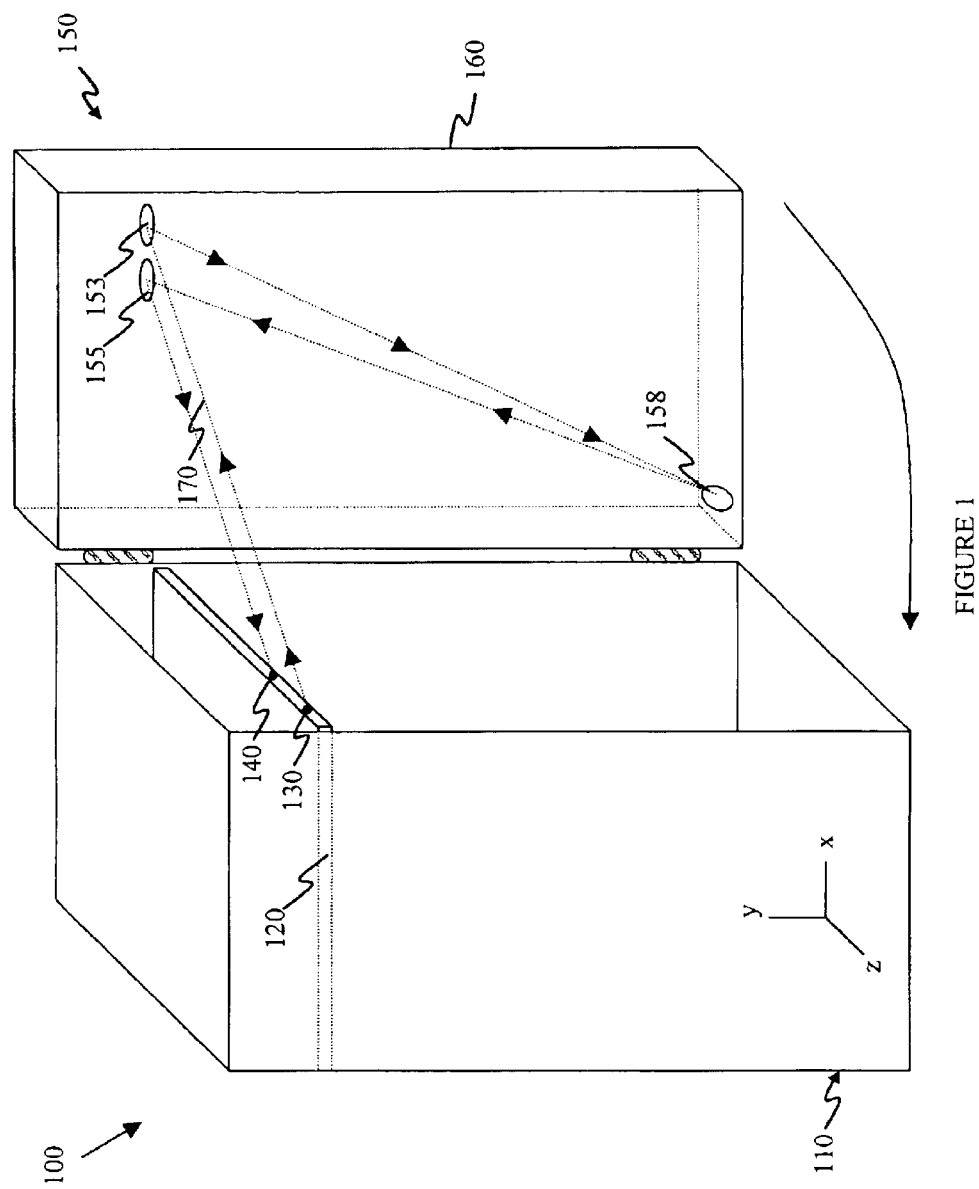
FIG. 1 illustrates a three-dimensional drawing of one embodiment of an optical communications system constructed in accordance with the principles of the present invention.

Turning now to FIG. 1, illustrated is a three-dimensional drawing of one embodiment of an optical communications system 100 constructed in accordance with the principles of the present invention. In the particular embodiment shown in FIG. 1, the optical communications system 100 includes a communications equipment chassis 110. As known by those skilled in the art, the communications equipment chassis 110 may be a typical rack mount configuration designed to house a plurality of removable communication cards 120. It should be noted, however, that the communications equipment chassis 110 is not limited to a small enclosure, but can include any size enclosure used for any communications application. For example, a bay for avionics equipment is one example of a communications equipment chassis in accordance with the principles of the present invention.

In one known embodiment of the present invention, the communications equipment chassis 110 comprises a protective enclosure having a height of approximately 80 inches. In such an embodiment, the 80-inch protective enclosure may be configured to receive and house a collection of eighty communication cards 120 (for example, switches, routers, servers, etc.). In one embodiment of the invention, the communications equipment chassis 110 includes an optically absorptive material on an inner surface thereof.

As further illustrated in FIG. 1, the optical communications system 110 may include a transmitter 130 and a receiver 140 positioned within the communications equipment chassis 110. In the illustrative embodiment shown in FIG. 1, the transmitter 130 and the receiver 140 are located on the single communication card 120, which has been secured in the communications equipment chassis 110. Other placements of the transmitter 130 and receiver 140 are well within the broad scope of the present invention. Further, while only a single transmitter 130 and a single receiver 140 are located on the communication card 120, depending on the thickness and width of the communication card 120, any number of transmitters and receivers may be located thereon.

The optical communications system 100 of FIG. 1 further includes a reflector system 150 coupled to a wall of the communications equipment chassis 110. In the particular embodiment shown in FIG. 1, the reflector system 150 is coupled to a door 160 of the communications equipment chassis 110. Other positions are, however, within the broad scope of the present invention.

The reflector system 150 in accordance with the principles of the present invention includes a signal incidence surface 153 and a signal reflective surface 155. It should initially be noted that the phrases "signal incidence surface" and "signal reflective surface" were chosen for ease of discussion. While each of the surfaces at one point or another may have a signal incident thereon, as well as reflect a signal therefrom, the terms as used herein have a specific meaning. For purposes of the present invention, a signal incidence surface is the surface upon which a signal first strikes after departing a transmitter, such as the transmitter 130. In contrast, a signal reflective surface is a surface upon which a signal last strikes before it encounters a receiver, such as the receiver 140.

Turning back to the illustrative embodiment of FIG. 1, the signal incidence surface 153 is positioned on the wall of the communications equipment chassis 110. Further, the signal incidence surface 153 is optically aligned with the transmitter 130, such as to first receive an incident signal from the transmitter 130.

Similarly, the signal reflective surface 155 is positioned on the wall of the communications equipment chassis 110. The signal reflective surface 155, however, is optically aligned with the receiver 140. Thus, the signal reflective surface 155 may reflect the signal to the receiver 140.

Even though specific locations for the signal incidence and reflective surfaces 153, 155, have been discussed, those skilled in the art understand that their placement may vary within the confines of the communications equipment chassis 110.

In the particular embodiment shown in FIG. 1, the reflector system 150 further includes a main reflector 158. The main reflector 158, in an exemplary embodiment, is coupled to the communications equipment chassis 110 at such a position as to receive the signal from the signal incidence surface 153 and direct the signal to the signal reflective surface 155. As shown, this position may be in the door 160 of the communications equipment chassis 110. It should be noted, however, that other positions inside the communications equipment chassis 110 are well within the scope of the present invention.

The operation of the optical communications device 100 illustrated in FIG. 1 will now be discussed. Note that while the door 160 of the communications equipment chassis 110 is shown in the open position in the embodiment of FIG. 1, this depiction is for illustrative purposes only, and actual operation of the optical communications system 100 would most likely require that the door 160 be in the closed position. Further, in certain embodiments of the invention, a latch may be used to keep the door 160 held in this closed position.

For simplicity, only the central ray of the transmitted signal is shown, and in most embodiments, the transmitted signal is slightly defocused to provide the dispersion needed to illuminate a significant portion of the main reflector 158. It should be noted that in an exemplary embodiment, the signal is a monochromatic radiation signal, however, it should also be noted that achromatic radiation signals are within the scope of the present invention.

In the particular embodiment shown in FIG. 1, a first signal 170 is transmitted from the transmitter 130. At this point the first signal 170 is traveling horizontally in the x-direction (positive x-direction) and encounters the signal incidence surface 153 optically aligned therewith. The positional configuration of the signal incidence surface 153 (e.g., rotation of the signal incidence surface 153 along the z-axis and the y-axis) then reflects the first signal 170 to the main reflector 158.

At this point the first signal 170 is traveling toward the main reflector 158, or in other words vertically down (negative y-direction) and into the page (negative z-direction). As described earlier, the main reflector 158 is positioned to receive the first signal 170 from the signal incidence surface 153, as well as positioned to direct the first signal 170 to the signal reflective surface 155.

Accordingly, the main reflector 158 substantially reverses the direction of the first signal 170, or in other words directs the first signal 170 vertically up (positive y-direction) and out of the page (positive z-direction), thus, toward the signal reflective surface 155. The positional configuration of the signal reflective surface 155 (e.g., rotation of the signal reflective surface 155 along the z-axis and the x-axis) then redirects the first signal 170 to the receiver 140.

Figure 2:
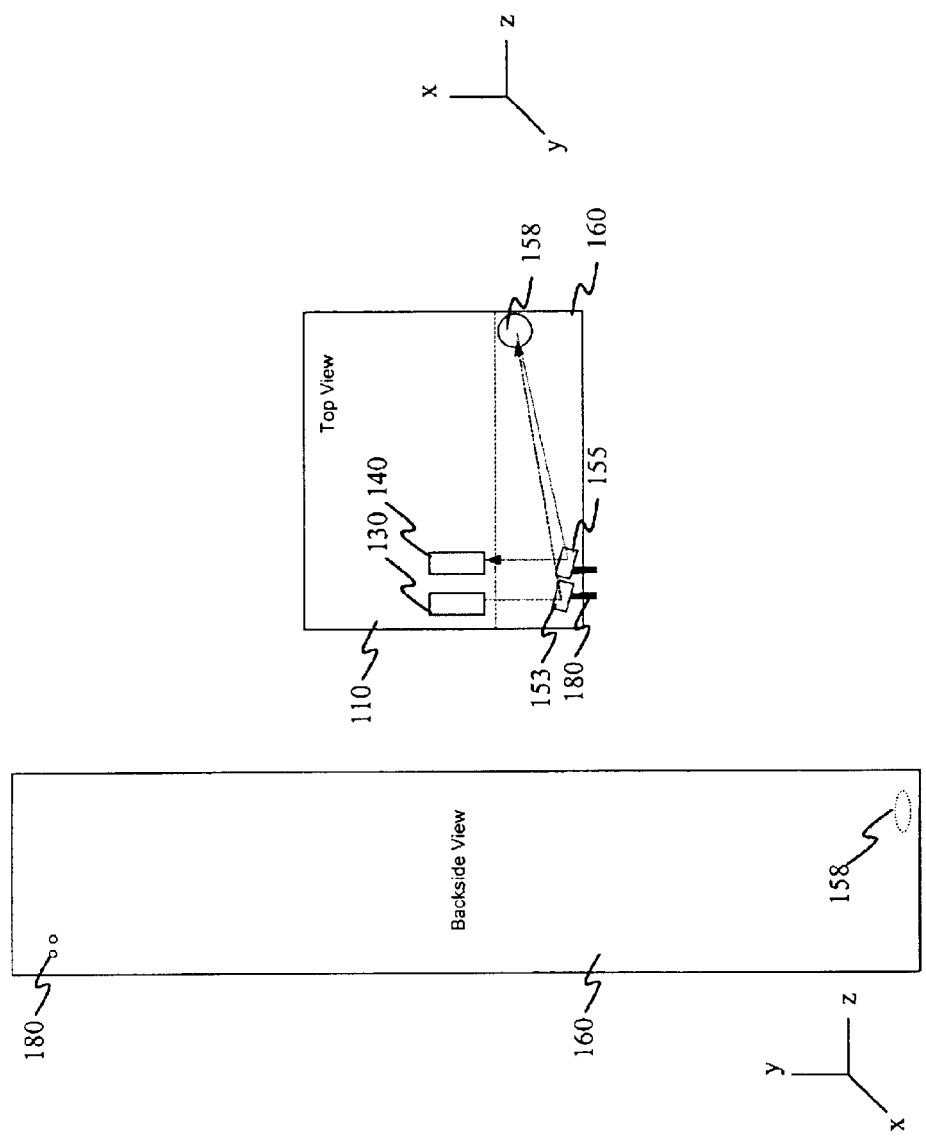
FIG. 2 illustrates two different views of the optical communications system illustrated in FIG. 1.

Turning briefly to FIG. 2, illustrated are two different views of the optical communications system 100 illustrated in FIG. 1. Namely, FIG. 2 illustrates a top view and a backside view of the optical communications system 100 illustrated in FIG. 1. FIG. 2 illustrates one technique that might be employed to accurately align the signal incidence and signal reflective surfaces 153, 155, with the main mirror 158. In the embodiment of FIG. 2, adjustment screws 180 are used to adjust a position of the signal incidence and signal reflective surfaces 153, 155, along both the z-axis and the x-axis. In an alternative embodiment, the signal incidence and signal reflective surfaces 153, 155 are microelectro-mechanical system (MEMS) mirrors and may be rotated accordingly.

While it has been discussed that each of the signal incidence and signal reflective surfaces 153, 155 may tilt about a downward axis (e.g., along the x-axis) as well as a horizontal axis (e.g., along the z-axis), it should be noted that certain embodiments of the signal incidence and signal reflective surfaces 153, 155 may only rotate about one axis or the other.

It should be noted, however, that a two-dimensional angle of rotation is desired in most embodiments to establish an unobstructed light path. If a single degree of angular freedom was used (for example, downward tilt only along the z-axis), the location of the transmitter 130 could be constrained, and in practical implementations no more than a dozen of such communications cards 120 could be interconnected. In certain cases, one degree of freedom in the angular positioning of the signal incidence surface 153 and of the signal reflective surface 155 is sufficient. However, in certain other cases, such as shown, more than one degree of freedom in the angular positioning of the signal incidence surface 153 and of the signal reflective surface 155 provides for an arbitrary number of communication cards 120 within a confined volume. While this present invention includes arrangement where a degree of freedom is provided by the spatial positioning of the transmitter 130 and receiver 140, a preferred embodiment uses two degrees of freedom in the selection of the signal incidence surface 153 and of the signal reflective surface 155.

Figure 3:
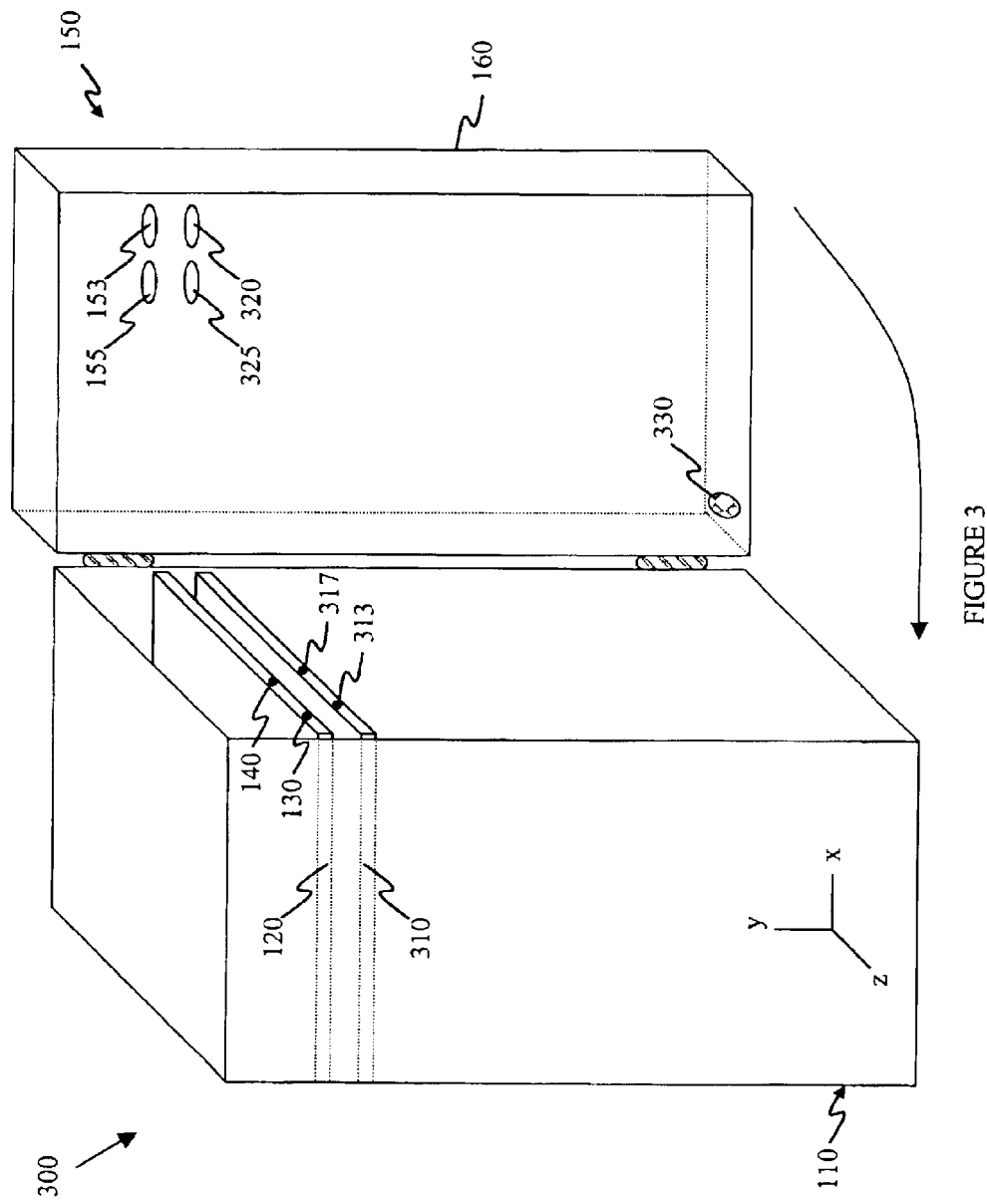
FIG. 3 illustrates a three-dimensional drawing of another embodiment of an optical communications system constructed in accordance with the principles of the present invention.

Turning now to FIG. 3, illustrated is a three-dimensional drawing of another embodiment of an optical communications system 300 constructed in accordance with the principles of the present invention. The optical communications system 300 of FIG. 3 is somewhat similar to the optical communications system 100 of FIG. 1, thus, where like numbers are used, those element correspond to the elements of FIG. 1.

In addition to the elements of FIG. 1, the optical communications system 300 further includes a second communications card 310 having a second transmitter 313 and second receiver 317 coupled thereto. As illustrated, the second communication card 310 is positioned in the communications equipment chassis 110, and under the first communication equipment card 120. Other positions for the second communications card 310 are possible.

The optical communications system 300 of FIG. 3 further includes a second signal incidence surface 320 and a second signal reflective surface 325. Similar to the signal incidence surface 153 and the signal reflective surface 155, the second signal incidence surface 320 and the second signal reflective surface 325 are positioned on the wall of the communications equipment chassis 110. Further, the second signal incidence surface 320 and the second signal reflective surface 325 are optically aligned with the second transmitter 313 and second receiver 317, respectively.

FIG. 3 further includes a main reflector 330. The main reflector 330, in contrast to the main reflector 158 (FIG. 1), comprises a convex surface providing negative optical gain. An example of such a reflector is an Edmund Scientific's cylindrical reflector (e.g., part numbers NT46-206, 7, 8, 9, and 210). This has the desirable characteristic of controlled dispersion in one plane and very little dispersion in the orthogonal plane. Thus, light reflected can be spread to illuminate the first and second signal reflective surfaces 155, 325, and little light is dispersed in directions where it might be lost. Accordingly, the embodiment of FIG. 3 proximates an all-in-all-out type system. Note, while the main reflector 158 of FIG. 1 and the main reflector 330 of FIG. 2 are different, this is not always the situation. For example, many of the embodiments of the device shown in FIG. 1 will have a main reflector 158 similar to the main reflector 330 of FIG. 3.

In some embodiments, it may be desirable for the main reflector 330 to have a complex shape, to provide a plurality of reflective directions, to balance the dynamic range of the signal power from a plurality of transmitters to a plurality of receivers, and to accomplish other ends. (Some examples are shown in FIGS. 5A and 5B)

Figure 4:
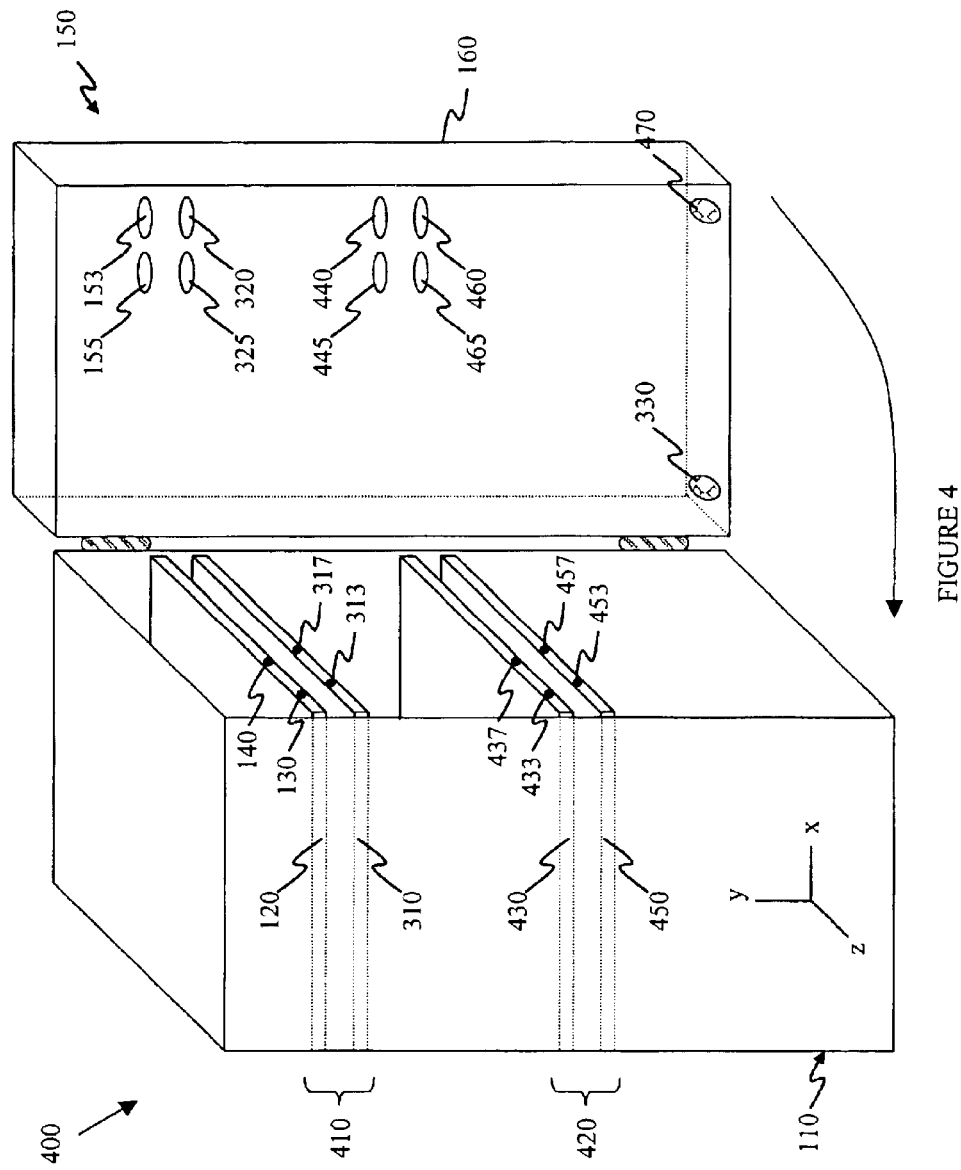
FIG. 4 illustrates a three-dimensional drawing of another embodiment of an optical communications system constructed in accordance with the principles of the present invention.

Turning now to FIG. 4, illustrated is a three-dimensional drawing of another embodiment of an optical communications system 400 constructed in accordance with the principles of the present invention. The optical communications system 400 of FIG. 4 is somewhat similar to the optical communications system 300 of FIG. 3, thus, where like numbers are used, those element correspond to the elements of FIG. 3.

In addition to the elements of FIG. 3, the optical communications system 400 further includes a third communications card 430 having a third transmitter 433 and third receiver 437 coupled thereto. Further, the optical communications system 400 includes a third signal incidence surface 440 and a third signal reflective surface 445 positioned on the wall of the communications equipment chassis 110 and optically aligned with the third transmitter 433 and third receiver 437, respectively.

Similarly, the optical communications system 400 further includes a fourth communications card 450 having a fourth transmitter 453 and fourth receiver 457 coupled thereto. Further, the optical communications system 400 includes a fourth signal incidence surface 460 and a fourth signal reflective surface 465 positioned on the wall of the communications equipment chassis 110 and optically aligned with the fourth transmitter 453 and fourth receiver 457, respectively.

The optical communications system 400 of FIG. 4 further includes a second main reflector 470 coupled to the communications equipment chassis 110. As illustrated in the embodiment of FIG. 4, the second main reflector 470 may be positioned in the door 160 of the communications equipment chassis 110 and proximate the main reflector 330. While the second main reflector is shown in the bottom of the communications equipment chassis 110, those skilled in the art understand that other placements, including the top of the communications equipment chassis 110, are within the broad scope of the present invention.

In comparison to the main reflector 330 being aligned with the first and second signal incidence and signal reflective surfaces 153, 320, 155, 325, the second main reflector 470 is aligned with the third and fourth signal incidence and signal reflective surfaces 440, 460, 445, 465. In the embodiment of FIG. 4, the first and second main reflectors 330 and 470 are designed to redirect signals along certain planes and not along certain others (e.g., an orthogonal plane). This allows the signals associated with the first and second main reflectors 330 and 470 to be independent of each other. Accordingly, the first and second communication cards 120, 310, and their associated surfaces and mirrors form a first bus 410, and the third and fourth communication cards 430, 450, and their associated surfaces and mirrors form a second bus 420.

Turning now to FIGS. 5A and 5B with continued reference to FIGS. 1–4, illustrated are two different configurations for the optical backplane 150, in accordance with the principles of the present invention. The embodiment of FIG. 5A illustrates a shared optical bus situation. As such, every transmitter within the communications equipment chassis 510 communicates with every receiver within the communications equipment chassis 510. In the embodiment of FIG. 5A, both of the main reflectors 520 are shown as flat surfaces. It should be noted, however, convex structures providing negative optical gain are well within the scope of this embodiment, and possibly preferred.

In contrast to that of FIG. 5A, FIG. 5B illustrates a multiple optical bus situation. In the embodiment of FIG.

5B, baffles 530 are positioned at unique locations within the communications equipment chassis 510, setting up the multiple optical bus situation. In this situation, the baffles 530 substantially prevent certain signal incidence and reflective surfaces from communicating with other signal incidence and reflective surfaces. In the embodiment of FIG. 5B, multiple main reflectors 540 are also used. The embodiment of FIG. 5B, thus, provides the opportunity for redundant optical busses, dedicated optical busses, or segregated optical busses.

It should be noted that in both cases illustrated by FIGS. 5A and 5B, the dual main reflector 520, 540 implementation, allows for using longer light paths than would be used if a single main reflector were used.

Uniquely, the embodiments of FIGS. 5A and 5B each include a point "Z" which is common to every signal within a given optical bus. It has been observed that by placing a reflective surface, such as a partial reflector 545, at that point "Z", a portion of those signals can be redirected from the communications equipment chassis 510. In an exemplary embodiment, those signals redirected from the communications equipment chassis 510 can be redirected to an adjacent communications equipment chassis. This embodiment, however, requires that a port 550 be positioned in the communications equipment chassis 510 to allow those signals to exit therefrom.

Figure 6:
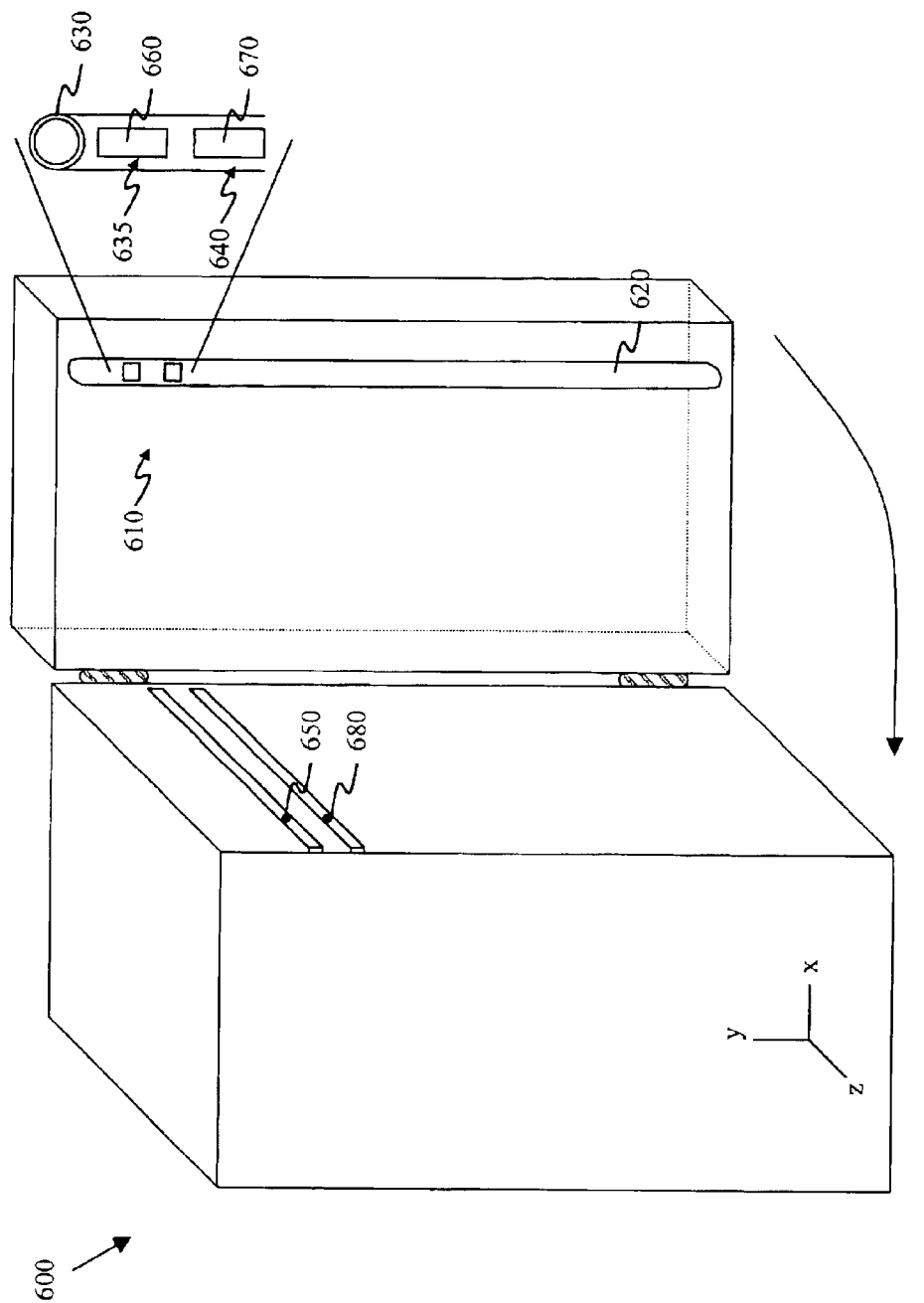
FIG. 6 illustrates a three-dimensional view of an alternative optical communications system constructed in accordance with the principles of the present invention.

Turning now to FIG. 6, illustrated is a three-dimensional view of an alternative optical communications system 600 constructed in accordance with the principles of the present invention. The embodiment of FIG. 6 includes an optical backplane 610 comprised of a tube or rod 620 having a reflective coating 630 formed on an inner surface or outer surface thereof, respectively. In the illustrative embodiment shown, windows 635, 640, have been formed in the reflective coating 630. The window 635 allows a signal sent from a transmitter 650 to encounter a signal incidence surface 660. Likewise, the window 640 allows a signal bouncing around the inside of the tube or rod 620 to encounter a signal reflective surface 670 and be redirected to a receiver 680.

While the optical backplane 610 is shown as a straight tube or rode, this arrangement need not be restricted in this manner. More complex transmissive bodies are practical, and may be desirable for applications other than that illustrated in FIG. 6. For example, in one embodiment the inner surface of the tube or rod 620 is roughened to disperse the signal better. In another embodiment, a reflective cap is placed over both ends of the tube or rod 620. In some embodiments, it may be desirable to embody all the features attributed thus far to the enclosure, into an integral part of the structure housing the collective, for example, integrating such features into an equipment rack.

Further, while only a single tube or rod 620 has been shown, those skilled in the art understand that more than one tube or rod is within the scope of the present invention. If used, the multiple tubes or rods can form multiple communication buses. In some embodiments of the invention, some data and communications connections are made by conventional blind-mated connections, well known in the prior art, in addition to optical connections made in the manner described herein, thus creating a hybrid connection set within the optical communications systems.

Regardless of which optical backplane disclosed above is being used, or for that matter any other embodiment within the scope of the present invention, once the receiver receives the optical signal, the receiver may decipher the signal (or combination of signals) and extract the information deemed important. In an exemplary embodiment of the present invention, a device, such as a media access control (MAC) device, may be used to extract the relevant information. It should be noted that any other similar device capable of extracting the relevant information is within the scope of the present invention.

Figure 7:
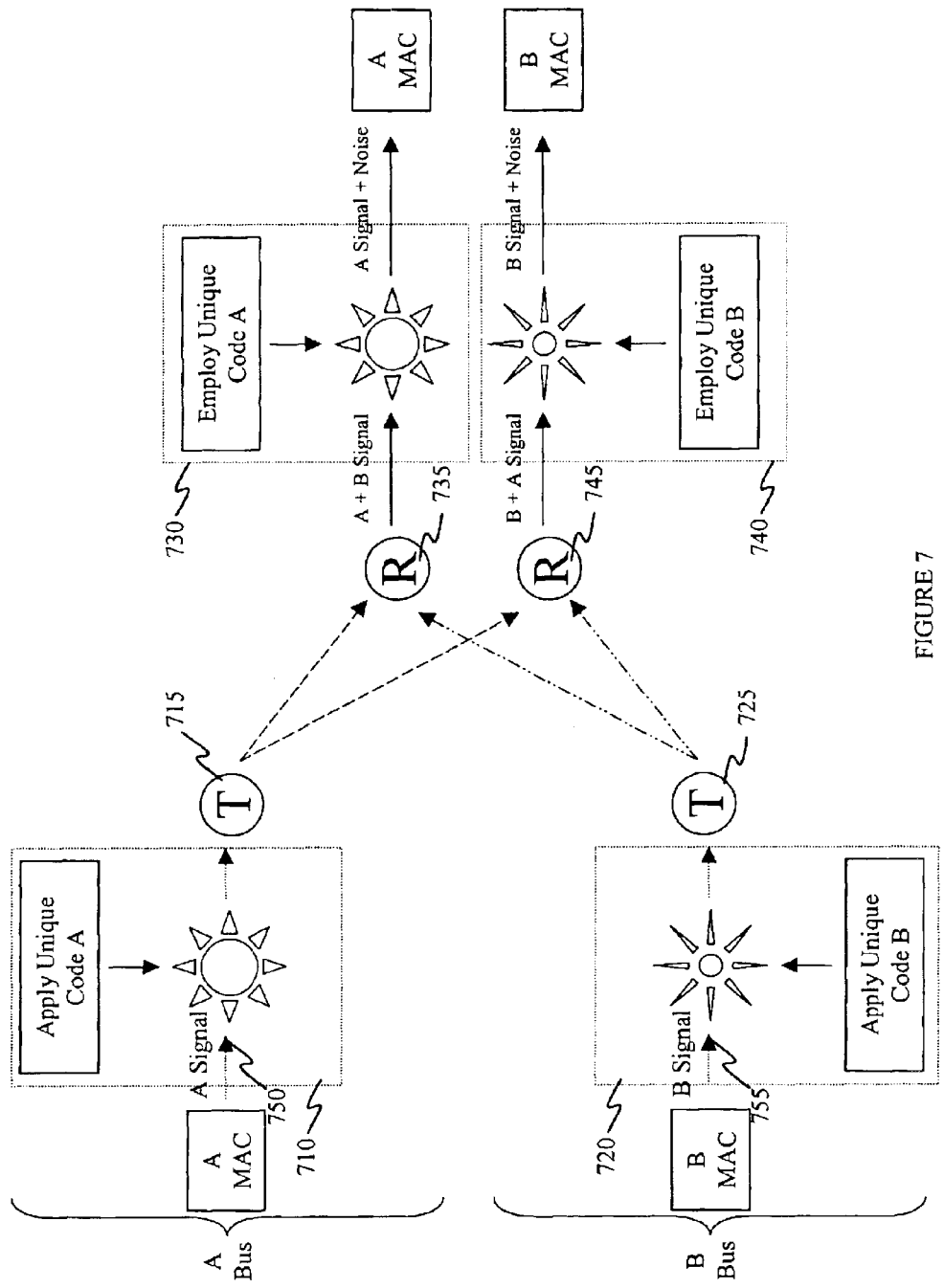
FIG. 7 illustrates another embodiment of an optical communications system constructed in accordance with the principles of the present invention.

Turning now to FIG. 7, illustrated is another embodiment of an optical communications system 700, constructed in accordance with the principles of the present invention. The optical communications system 700 illustrated in FIG. 7 includes an optical backplane similar to that illustrated in FIGS. 1–6, however, the optical communications system 700 further includes a first encoder 710 and a second encoder 720. As illustrated, the first encoder 710 and second encoder 720 are associated with a first transmitter 715 and a second transmitter 725. The optical communications system 700 further includes a first decoder 730 and a second decoder 740. Similarly, the first decoder 730 and second decoder 740 are associated with a first receiver 735 and a second receiver 745, respectively. The term encoder and decoder includes a variety of devices, including but not limited to, multiplexers and demultiplexers, and other similar devices.

In the illustrative embodiment of FIG. 7, the first encoder 710 employs a first unique code to encode a first data stream 750 to be sent to the first transmitter 715. Similarly, in the illustrative embodiment of FIG. 7, the second encoder 720 employs a second unique code to encode a second data stream 755 to be sent to the second transmitter 725.

As is illustrated in the embodiment of FIG. 7, the first receiver 735 receives both first and second signals including both the first and second data streams 750, 755. Likewise, the second receiver 745 receives both first and second signals including both the first and second data streams 750, 755. Thereafter, the first decoder 730 employs the first unique code to obtain the first data stream 750 from its combined signal, and the second decoder 740 employs the second unique code to obtain the second data stream 755 from its combined signal.

A unique aspect of the present invention is that the unique codes are programmable. Accordingly, programming the, unique code in one fashion or another may redirect which signal goes to which bus. For example, if unique code A and unique code B were swapped, the signal that would have gone to Bus A in the original example could then be redirected to Bus B, and vice versa.

Another unique aspect of the present invention is that any known or hereafter discovered degree of orthogonality may be used to encode or decode the various signals within the communications system. Thus, not only may unique codes as discussed above be employed, other degrees of orthogonality, such as dense wavelength division multiplexing (DWDM), time division multiple access (TDMA), orthogonal frequency division multiplexing (OFDM), and others, may be used. Further, while it has been depicted that the encoding and decoding is employed while the signal is an electrical signal, other situations exist where the encoding and decoding is employed while the signal is an optical signal.

In conclusion, the present invention should not be limited just to that mentioned above. For example, in another embodiment, the optical communications system in accordance with the principles of the present invention includes the optical bus and related transmitters and receivers, which may be retrofitted into existing slots such as, but not limited to, PCI slots of existing collectives. In some embodiments it may be desirable to use MEMS elements to allow low tolerance installation of the elements within the collective system. Further, in some embodiments, it may be desirable to use the communications equipment chassis as a plenum to distribute cooling air to the elements therein.

In a broad sense, the present invention is configured to indiscriminately dump signals comprising photons into an enclosure and subsequently, indiscriminately withdraw all the signals from the enclosure and deciphers the signals as required, using the MAC layer and other steps to decipher the signals. As such, the present invention, may in part, provide the optical Ethernet, but is not limited to an Ethernet implementations.

In some embodiments, it will be desirable to implement the features of other patents filed in the year 2002, and assigned to Incucomm Inc., namely attorney docket number 28947.5 entitled Wireless Optical System for High Bandwidth Communications, Ser. No. 10/090,249, to Volpi et al., and attorney docket number 28947.6 entitled Wireless Optical System for Multidirectional High Bandwidth Communications, Ser. No. 10/090,270, to Volpi et al., both of which have been incorporated by reference as if enclosed herein in their entirety. For example, the use of advanced signal processing for the purposes of higher data rates at lower optical power levels, the use of error detection and correction in the course of optical transmission and reception, and the use of complex reflector shapes previously described, may be applied to the present invention.

Although the present invention has been described in detail, those skilled in the art should understand that they can make various changes, substitutions and alterations herein without departing from the spirit and scope of the invention in its broadest form.

What is claimed is:

1. An optical backplane for use with a communications equipment chassis, comprising:
a reflector system including a main reflector coupled to a wall of a communications equipment chassis and having first and second signal incidence surfaces and first and second signal reflective surfaces, said first and second signal incidence surfaces being positioned on said wall and optically alignable with a transmitter positioned within said communications equipment chassis and said first and second signal reflective surfaces being positioned on said wall and optically alignable with a receiver positioned within said communications equipment chassis, said main reflector being positioned to receive a first signal from said first incidence surface and a second signal from said second incidence surface and direct said first and second signals to said first and said second reflective surfaces, respectively, said reflector system further including a partial reflector located at an intersection point common to said first and second signals and further positioned to redirect a portion of said first and second signals from said communications equipment chassis.

2. The optical backplane as recited in claim 1 further including a port positioned to allow said portion of said first and second signals to exit said communications equipment chassis.

3. The optical backplane as recited in claim 1 wherein said main reflector comprises a convex surface providing negative optical gain.

4. The optical backplane as recited in claim 1 wherein said main reflector is a first main reflector, and wherein said reflector system further includes a second main reflector coupled to said communications equipment chassis, third and fourth signal incidence surfaces positioned on said wall and optically alignable with corresponding transmitters positioned within said communications equipment chassis, and third and fourth signal reflective surfaces positioned on said wall and optically alignable with corresponding receivers positioned within said communications equipment chassis, said second main reflector positioned to receive third and fourth signals from said third and fourth signal incidence surfaces and simultaneously direct said third and fourth signals to each of said third and fourth signal reflective surfaces.

5. The optical backplane as recited in claim 4 further including baffles located within said communications equipment chassis and positioned to substantially prevent said first and second signal incidence and reflective surfaces from optically communicating with said third and fourth signal incidence and reflective surfaces.

6. The optical backplane as recited in claim 1 wherein said reflector system comprises a tube or rod having a reflective coating on an inside surface or outside sure thereof, respectively, and along a length thereof, and further having a window through which one of said first and second signals may enter or exit sad tube or rod, said window located adjacent one of said first and second signal incidence surfaces or one of said first and second signal reflective surfaces.

7. The optical backplane as recited in claim 6 wherein said tube or rod is a first tube or rod forming a first signal bus, and further including a second tube or rod positioned proximate said first tube or rod and forming a second signal bus.

8. The optical backplane as recited in claim 1 wherein said first and second signal incidence surfaces and said first and second signal reflective surfaces are coupled to a door of said communications equipment chassis.

9. The optical backplane as recited in claim 1 wherein said first and second signal incidence surfaces and said first and second signal reflective surfaces include a micro-electro-mechanical system (MEMS) device rotatable along at least one axis.

10. An optical communications system, comprising:
a communications equipment chassis;
first and second transmitters and first and second receivers positioned within said communications equipment chassis; and
a reflector system including a main reflector coupled to a wall of said communications equipment chassis and having first and second signal incidence surfaces and first and second signal reflective surfaces, said first and second signal incidence surface being positioned on said wall and optically aligned with said first and second transmitters, respectively, and said first and second signal reflective surfaces being positioned on said wall and optically aligned with said first and second receivers, respectively, said main reflector being positioned to receive a first signal from said first incidence surface and second signal from said second incidence surface and direct said first and second signals to said first and said second reflective surfaces, respectively, said reflector system further including a partial reflector located at an intersection point common to said first and second signals and further positioned to redirect a portion of said first and second signals from said communications equipment chassis.

11. The optical communications system as recited in claim 10 wherein said main reflector is a first main reflector, and wherein said reflector system further includes a second main reflector coupled to said communications equipment chassis, third and fourth signal incidence surfaces positioned on said wall and optically aligned with third and fourth transmitters positioned within said communications equipment chassis, respectively, and third and fourth signal reflective surfaces positioned on said wall and optically aligned with third and fourth receivers positioned within said communications equipment chassis, respectively, said second main reflector positioned to receive third and fourth signals from said third and fourth signal incidence surfaces, respectively, and simultaneously direct said third and fourth signals to each of said third and fourth signal reflective surfaces, said first and second transmitters and receivers forming a first bus and said third and fourth transmitters and receivers forming a second bus.

12. The optical communications system as recited in claim 10 further including first and second encoders and decoders, said first and second encoders associated with said first transmitter and said second transmitter, respectively, said first and second decoders associated with said first receiver and said second receiver, respectively, said first encoder employing a first unique code to encode a first data stream to be sent to said first transmitter, said second encoder employing a second unique code to encode a second data stream to be sent to said second transmitter, said first receiver receiving said first and second signals and said first decoder employing said first unique code to decode said first data stream therefrom, said second receiver receiving said first and second signals and said second decoder employing said second unique code to decode said second data stream therefrom.

13. The optical communications system as recited in claim 12 wherein said first and second unique codes are programmable codes, said first and second encoders and said first and second decoders configurable to change said programmable codes.

14. The optical communications system as recited in claim 10 further including an encoder and a decoder, wherein said encoder is configured to encode a data stream employing a unique code and send said encoded data stream to one of said first and second transmitters, and said decoder is configured to employ said unique code to decode a signal received from one of said first and second receivers to obtain said data stream therefrom.

15. The optical communications system as recited in claim 14 wherein said encoder and said decoder have associated media access controllers.

16. The optical communications system as recited in claim 10 wherein said reflector system comprises a tube or rod having a reflective coating on an inside surface and an outside surface thereof, respectively, and along a length thereof, and further having a window through which one of said first and second signals may enter or exit said tube or rod, said window located adjacent one of said first and second signal incidence surfaces or one of said first and second signal reflective surfaces.

17. The optical communications system as recited in claim 16 wherein said tube or rod is a first tube or rod forming a first signal bus, and further including a second tube or rod positioned proximate said first tube or rod and forming a second signal bus.

18. A method for operating an optical communications system, comprising:
transmitting first and second signals from first and second transmitters, respectively, located within a communications equipment chassis to first and second signal incidence surfaces, respectively, positioned on a wall of said communications equipment chassis;
reflecting said first and second signals from said first and second signal incidence surfaces to a main reflector coupled to said communications equipment chassis;
directing said first and second signals from said main reflector to first and second reflective surfaces positioned on a wall of said communications equipment chassis;
redirecting said first and second signals from said first and second signal reflective surfaces to first and second receivers positioned in said communications equipment chassis; and
redirecting a portion of said first and second signals from said communications equipment chassis via a partial reflector located at an intersection point common thereto.

19. The method as recited in claim 18 wherein said directing includes dispersing one of said first and second signals to create a dispersed signal from said main reflector to a plurality of signal reflective surfaces positioned on said wall of said communications equipment chassis, and said redirecting includes steering said dispersed signal from said plurality of signal reflective surfaces to associated receivers positioned in said communications equipment chassis.

20. The method as recited in claim 18 wherein said main reflector is a first main reflector and said method, further comprises:
transmitting third and fourth signals from third and fourth transmitters, respectively, located within said communications equipment chassis to third and fourth signal incidence surfaces, respectively, positioned on a wall of said communications equipment chassis;
reflecting said third and fourth signals from said third and fourth signal incidence surfaces to a second main reflector coupled to said communications equipment chassis;
directing said third and fourth signals from said second main reflector to third and fourth reflective surfaces positioned on a wall of said communications equipment chassis; and
redirecting said third and fourth signals from said third and fourth signal reflective surfaces to third and fourth receivers positioned in said communications equipment chassis.

21. The method as recited in claim 18 wherein said reflecting, directing and redirecting includes reflecting, directing and redirecting using a tube or rod having a reflective coating on an inside surface or outside surface thereof, respectively, said reflective coating being removed from a region adjacent one of said first and second signal incidence surfaces and one of said first and second signal reflective surfaces.

22. The method as recited in claim 18 wherein said method is employable with first and second encoders associated with said first and second transmitters respectively, and first and second decoders associated with said first and second receivers respectively, said first encoder employing a first unique code to encode a first data stream to be sent to said first transmitter, said second encoder employing a second unique code to encode a second data stream to be sent to said second transmitter, said first decoder employing said first unique code to decode said first data stream therefrom, said second decoder employing said second unique code to decode said second data stream therefrom.

23. The method as recited in claim 22 wherein said first and second unique codes are programmable codes, said first and second encoders and said first and second decoders configurable to change said programmable codes.

24. The method as recited in claim 18 further including an encoder and a decoder, wherein said encoder is configured to encode a data stream employing a unique code and send said encoded data stream to one of said first and second transmitters, and said decoder is configured to employ said unique code to decode a signal received form one of said first and second receivers to obtain said data stream therefrom.

25. The method as recited in claim 24 wherein said encoder and said decoder have associated media access controllers.

* * * * *